(12) United States Patent
Shin et al.

(10) Patent No.: US 11,650,160 B2
(45) Date of Patent: May 16, 2023

(54) THREE-DIMENSIONAL RAMAN IMAGE MAPPING MEASURING DEVICE FOR FLOWABLE SAMPLE

(71) Applicant: P&K Skin Research Center, Seoul (KR)

(72) Inventors: Jin-Hee Shin, Seoul (KR); Nu-Ri Yang, Seoul (KR); Jin-Oh Park, Seoul (KR)

(73) Assignee: P&K Skin Research Center, Seoul (KR)

( * ) Notice: Subject to any disclaimer, the term of this patent is extended or adjusted under 35 U.S.C. 154(b) by 0 days.

(21) Appl. No.: 17/599,742

(22) PCT Filed: Mar. 24, 2020

(86) PCT No.: PCT/KR2020/003998
§ 371 (c)(1),
(2) Date: Sep. 29, 2021

(87) PCT Pub. No.: WO2020/204435
PCT Pub. Date: Oct. 8, 2020

(65) Prior Publication Data
US 2022/0155235 A1 May 19, 2022

(30) Foreign Application Priority Data

Mar. 29, 2019 (KR) .................. 10-2019-0036479

(51) Int. Cl.
*G01N 21/65* (2006.01)
(52) U.S. Cl.
CPC ....... *G01N 21/65* (2013.01); *G01N 2021/651* (2013.01)
(58) Field of Classification Search
CPC .. G01N 21/65; G01N 2021/651; G01N 21/85; G01N 2201/1035;
(Continued)

(56) References Cited

U.S. PATENT DOCUMENTS

2008/0262324 A1* 10/2008 Van .................. A61B 5/0062
600/310
2018/0143415 A1* 5/2018 Hollricher ............ G02B 21/006

FOREIGN PATENT DOCUMENTS

JP H10-305025 A 11/1998
JP 2006-343133 A 12/2006
(Continued)

OTHER PUBLICATIONS

English Translation of Takazawa et al. is attached, comprising Abstract, Claims, Drawings, and Description only (Year: 2006).*
(Continued)

*Primary Examiner* — Tarifur R Chowdhury
*Assistant Examiner* — Akbar Hassan Rizvi
(74) *Attorney, Agent, or Firm* — The PL Law Group, PLLC

(57) ABSTRACT

A three-dimensional Raman image mapping measuring device for a flowable sample according to an embodiment of the present disclosure is designed to be capable of measuring a flowable sample during mapping measurement of a three-dimensional image that is a region of a confocal Raman by using a micro Raman spectrometer and a three-axis sample stage (Piezo stage). The three-dimensional Raman image mapping measuring device for a flowable sample includes at least one piezo element; an element holder equipped with the piezo element and having an opening, a sample stage for supporting the element holder equipped with the piezo element, an objective lens mounted in the opening in the element holder, a sample holder for controlling vertical movement of the flowable sample disposed under the lower portion of the sample stage, and a transparent window disposed between the sample stage and the sample holder.

6 Claims, 11 Drawing Sheets

(58) Field of Classification Search
CPC ............ G01N 2021/0339; G01J 3/0202; G01J 3/0208; G01J 3/024; G01J 3/0289; G01J 3/2823; G01J 2003/283; G01J 3/44
See application file for complete search history.

(56) References Cited

FOREIGN PATENT DOCUMENTS

| | | | |
|---|---|---|---|
| JP | 4498081 B2 | * | 7/2010 |
| JP | 2012-098184 A | | 5/2012 |
| JP | 2016-106374 A | | 6/2016 |
| WO | WO 2005/107579 A1 | | 11/2005 |

OTHER PUBLICATIONS

English Translation of Miyahara et al. is attached, comprising Abstract, Claims, and Description only in English, while Drawings only are in Japanese (Year: 1998).*
International Search Report for PCT/KR2020/003998 dated Jul. 13, 2020.

* cited by examiner

Prior Art

Prior Art

Prior Art (B)

(SURFACE) → DEPTH DIRECTION (A)

THREE-DIMENSIONAL RAMAN IMAGE MAPPING MEASURING DEVICE FOR FLOWABLE SAMPLE

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2020/003998, filed Mar. 24, 2020, which claims priority to the benefit of Korean Patent Application No. 10-2019-0036479 filed in the Korean Intellectual Property Office on Mar. 29, 2019, the entire contents of which are incorporated herein by reference.

BACKGROUND

1. Technical Field

This invention is related to a three-dimensional Raman image mapping measuring device for a flowable sample, more specifically, which is designed to be capable of measuring a flowable sample that is a region of a confocal Raman by using a micro Raman spectrometer and a three-axis sample stage (Piezo stage).

2. Background Art

In general, a Raman spectrophotometer is very different from general spectrophotometers in basic principle.

FIG. 1 is a diagram schematically showing a CCD-type single beam dispersion-type spectrometer, and FIG. 2 is a diagram to illustrate a measurement process of a general light absorption spectrum.

As shown in FIGS. 1 and 2, a general CCD-type single beam dispersion-type spectrometer (100) emits light in a broad wavelength range from a light source (110) and converts this light into a continuous single wavelength light by using a monochromator (120) that disperses light into each wavelength like a prism or a grating. The intensity of each wavelength is read simultaneously using a detector 130 such as CCD, or recorded by continuously scanning the light to the single point detector 130. After putting a sample (10) into a measurement light path, if the energy level of molecules or atoms of the sample (10) matches, the specific wavelength of light corresponding to the energy level is absorbed.

As a result, the light absorption spectrum shown in FIG. 2 is obtained. The light absorption spectrum can be measured with an intrinsic light absorption spectrum according to the molecular bond vibration, which is like a fingerprint, and thus is very useful for qualitative analysis of unknown samples.

Also, the absorbance is expressed as log(1/T)=abc. Here, the constants a and b are useful for quantitative analysis because they are proportional to the concentration c.

FIG. 3 is a diagram showing a region according to the wavelength of light.

As shown in FIG. 3, the type of light used in the spectrometer is very diverse from the shortest cosmic ray to the longest radio wave according to the length of its wavelength.

As for the quantum mechanical energy of light, the higher the frequency of light is, the greater the energy it has, and the shorter the wavelength is, the higher the energy it has. That is, the cosmic ray has the strongest energy and the radio wave has the lowest. Among these wavelengths of light, only the rays in the 400-700 nm band is visible to the human eye. Light with a shorter wavelength than this is ultraviolet and light with a longer wavelength is infrared. Especially, infrared is a very useful light for qualitative and quantitative analysis of compounds by matching it with the molecular binding energy level. Therefore, the light absorption spectrum for the same substance varies depending on which motion of the substance is matched.

FIG. 4 is a graph showing an ultraviolet light absorption spectrum of caffeine, and FIG. 5 is a diagram to illustrate a measurement process of a Raman scattering spectrum. FIG. 4 is an ultraviolet light absorption spectrum for caffeine contained in coffee, and FIG. 5 is an infrared spectrum and a Raman spectrum of it.

As shown in FIGS. 3 and 4, the wavelength of infrared is in the unit of μm and very long compared to ultraviolet and visible rays which are in the unit of nm. Therefore, the photoelectric effect of visible ray, in which electrons move by irradiation of light, is very weak. Instead, the infrared has long enough wavelength that can affect molecular bonding vibration and thus exhibits a strong characteristic as a hot wire for increasing the temperature of a material. Therefore, in order to effectively measure infrared, it is effective to use a material sensitive to temperature change as a detector rather than a material with a large photoelectric effect.

Among these materials, pyroelectric materials are the most effective materials, and triglycine sulfate (TGS), barium titanium oxide ($BaTiO_3$), and mercury cadmium telluride (MCT) are most commonly used materials as components of infrared detectors.

Infrared can measure various conformational motions of molecules by matching it with different kinetic energy levels in the molecular bonding of compounds, which is particularly useful for qualitative analysis of unknown samples. For this reason, infrared is the most widely used qualitative analysis tool.

However, on the contrary to the convenience of this method, there are limits on measuring a small sample (with a size in the unit of micro or less) or materials that can be used as a sample cell by using an infrared wavelength.

Meanwhile, unlike most conventional spectroscopy, Raman spectroscopy does not measure absorbance, but uses a characteristic in which the wavelength of a very small portion of light is changed as the light hits the sample and is scattered. This is slightly different from common sense. When light of a specific wavelength is irradiated to a certain material and scattered from the surface thereof, most of the light is reflected and scattered as it is, but a very small amount, for example about 0.3%, of light matches with the molecular kinetic energy as shown in FIG. 5 to transfer energy to the molecules so that the wavelength is lengthened (stock-line), or conversely, the light receives energy so that the wavelength is shortened (anti-stock line).

That is, the degree of change compared to the wavelength of the first irradiated light has energy corresponding to the infrared band, and thus a peak appears at the same position as the infrared light absorption spectrum. Therefore, the peak position is the same, but the size of the peak is different due to the difference of a response factor.

Meanwhile, FIG. 6 is a graph showing an infrared light absorption spectrum and a Raman scattering spectrum of caffeine.

As shown in FIG. 6, it may be found that the positions of peaks in the infrared light absorption spectrum and the Raman spectrum of caffeine are almost similar, but their magnitudes are different.

As such, the Raman spectrum is a very useful analysis tool for analyzing a molecular structure or unknown samples because it may obtain a spectrum of an infrared band by using a visible light with short wavelength (usually laser light). Especially, it is extremely advantageous for the analysis of small samples by using short wavelength light in a nanometer band, rather than the infrared in a micro band. In addition, since a general visible light optical material may be used, it is possible to measure micro-sized small samples when combined with a general optical microscope.

Meanwhile, infrared microscopes are disadvantageous for micro samples because they are expensive and have low resolution due to restrictions on materials used.

As a related prior document, there is Korea Unexamined Patent Publication No. 10-2015-0116999 (published on Oct. 19, 2015), and this document discloses a micro Raman and fluorescence spectroscopy device for multi-channel excitation light source switching.

SUMMARY

This invention is directed to providing a three-dimensional Raman image mapping measuring device for a flowable sample, which is designed to be capable of measuring a flowable sample during mapping measurement of a three-dimensional image as a region of a confocal Raman by using a micro Raman spectrometer and a three-axis sample stage (Piezo stage), in order to solve the problem in three-dimensional mapping measurement for a large living body sample.

According to the first embodiment in order to solve the technical problem written above, the three-dimensional Raman image mapping measuring device for a flowable sample should be comprised with followings: at least one piezo element; an element holder equipped with the piezo element and having an opening; a sample stage configured to support the element holder equipped with the piezo element; an objective lens mounted in the opening of the element holder; a sample holder disposed under the sample stage to control vertical movement of a flowable sample; and a transparent window mounted between the sample stage and the sample holder.

According to the second embodiment in order to solve the technical problem written above, the three-dimensional Raman image mapping measuring device for a flowable sample should be comprised with followings: at least one piezo element arranged in a vertical direction; an element holder equipped with the piezo element and having an opening; a sample stage arranged parallel to the piezo element to support the element holder equipped with the piezo element; an objective lens installed in a vertical direction to intersect the piezo element and mounted in the opening of the element holder; a transparent window mounted to a lower portion of the sample stage; a sample holder attached to the transparent window to support a flowable sample; and banding members attached to both side edges of the transparent window to press the sample holder so that the flowable sample comes into contact with the transparent window.

In the three-dimensional Raman image mapping measuring device for a flowable sample according to the present disclosure, a transparent window attached to the lower portion of the sample stage is located at the side opposite to the objective lens to physically hold the flowable sample and prevent shaking of the flowable sample. At the same time, the flowable sample is moved in the x-, y- and z-axis according to the movement of the piezo element, thereby enabling three-dimensional confocal image mapping.

In addition, in the three-dimensional Raman image mapping measuring device for a flowable sample according to the present disclosure, a transparent window is disposed at the side opposite to the objective lens and physically presses and fixes the flowable sample to prevent shaking of the flowable sample, and moreover, in a state where the flowable sample is fixed in contact with the transparent window by the banding members pressing down the sample holder, the flowable sample is moved in the x-, y- and z-axis according to the movement of the piezo element, thereby enabling three-dimensional confocal image mapping.

As a result, the three-dimensional Raman image mapping measuring device for a flowable sample according to the present invention can perform measurement for three-dimensional confocal image mapping by means of the banding member whose binding position is controlled even when the flowable sample has a very large size.

DETAILED DESCRIPTION

Advantages and features of the present disclosure, along with method for achieving them, will become apparent with reference to the embodiments described below in detail in conjunction with the accompanying drawings. However, the present invention is not limited to the embodiments disclosed below, but will be implemented in various different forms. The following embodiments are just for perfect invention and are intended to give perfect understanding of the present invention to those with ordinary knowledge in the technical field to which the present invention belongs, and the present invention is only defined by the scope of the claims. Same reference symbols refer to the same elements throughout the specification.

Hereinafter, a three-dimensional Raman image mapping measuring device for a flowable sample according to preferred embodiments of the present invention will be described in detail with reference to the accompanying drawings.

Figure 1:
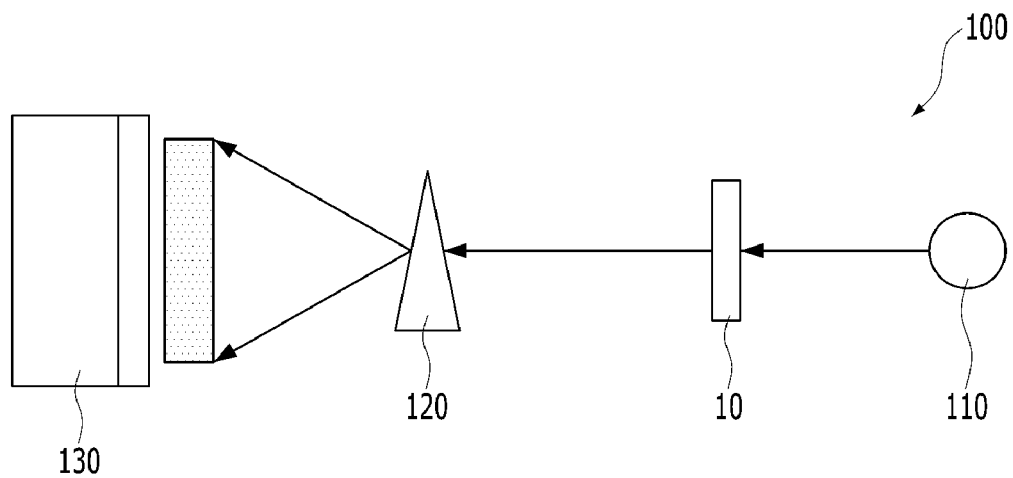
FIG. 1 is a diagram schematically showing a CCD-type single beam dispersion-type spectrometer.
Figure 2:
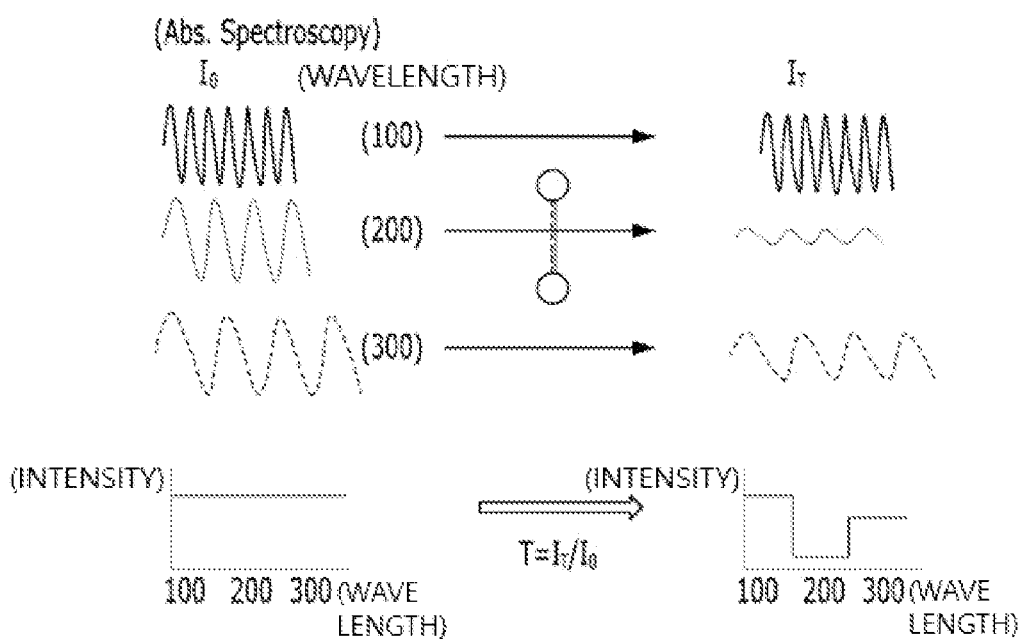
FIG. 2 is a diagram to illustrate a measurement process of a general light absorption spectrum.
Figure 3:
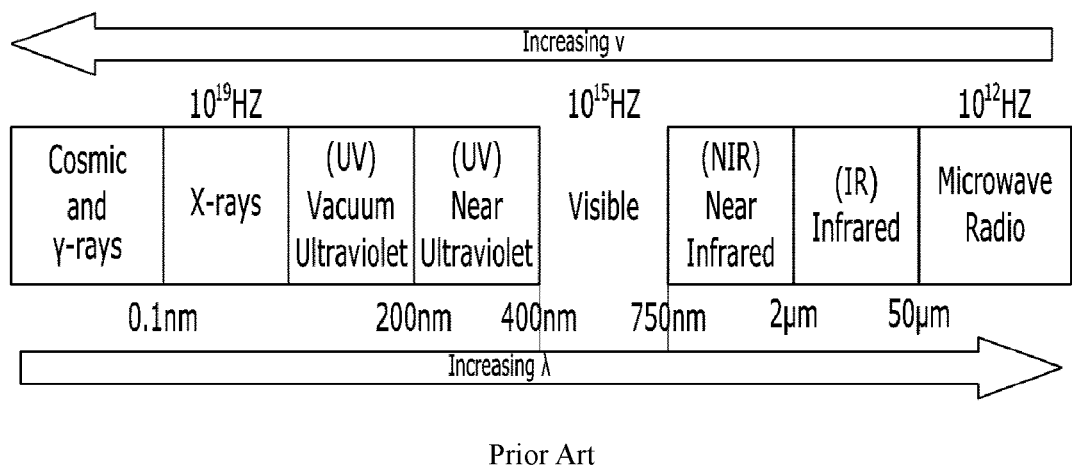
FIG. 3 is a diagram showing a region according to the wavelength of light.
Figure 4:
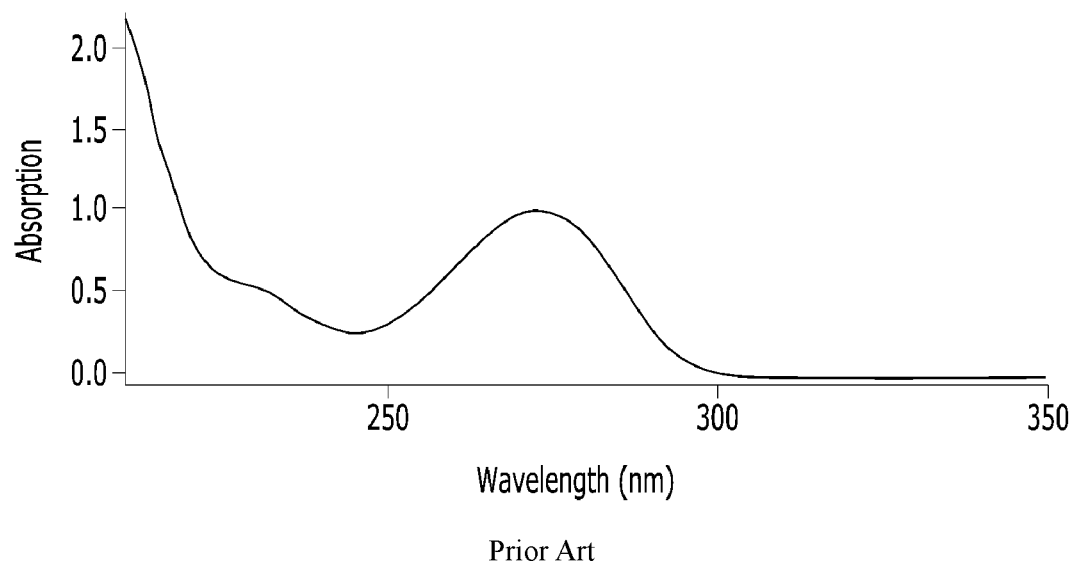
FIG. 4 is a graph showing an ultraviolet light absorption spectrum of caffeine.
Figure 5:
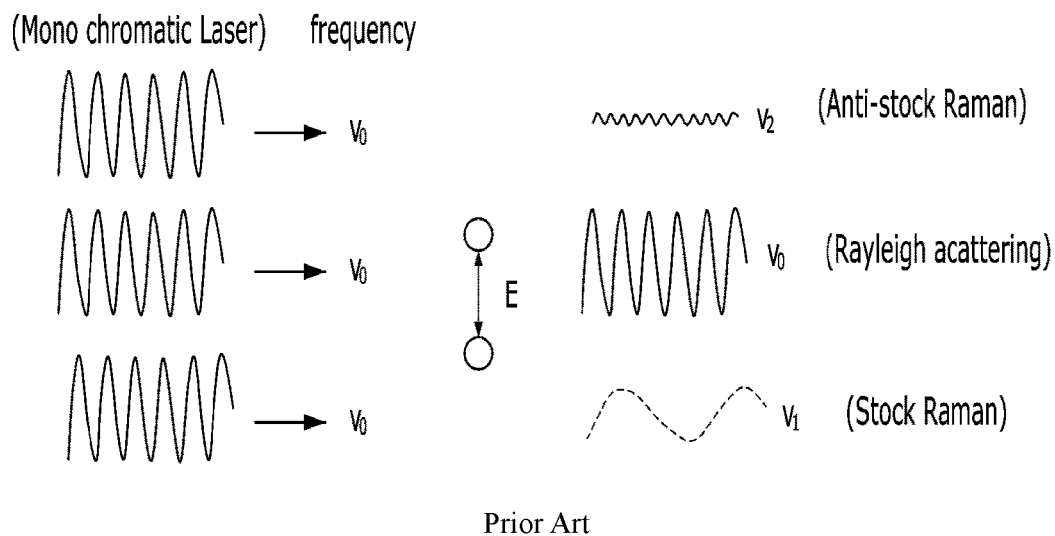
FIG. 5 is a diagram to illustrate a measurement process of a Raman scattering spectrum.
Figure 6:
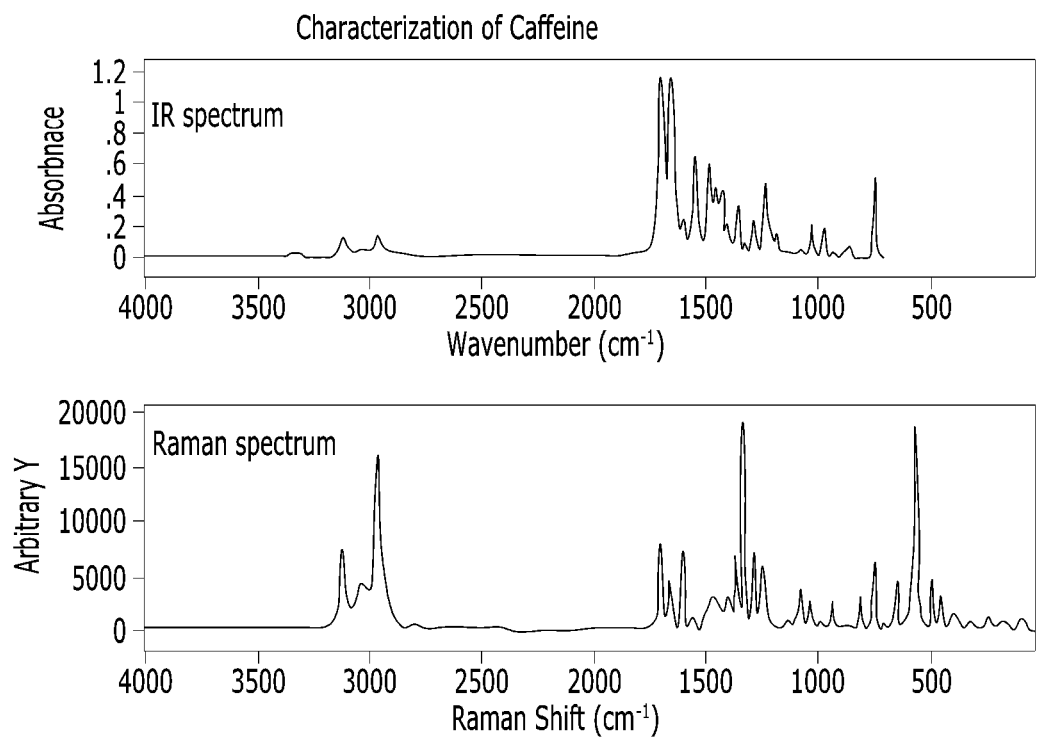
FIG. 6 is a graph showing an infrared light absorption spectrum and a Raman scattering spectrum of caffeine.
Figure 7:
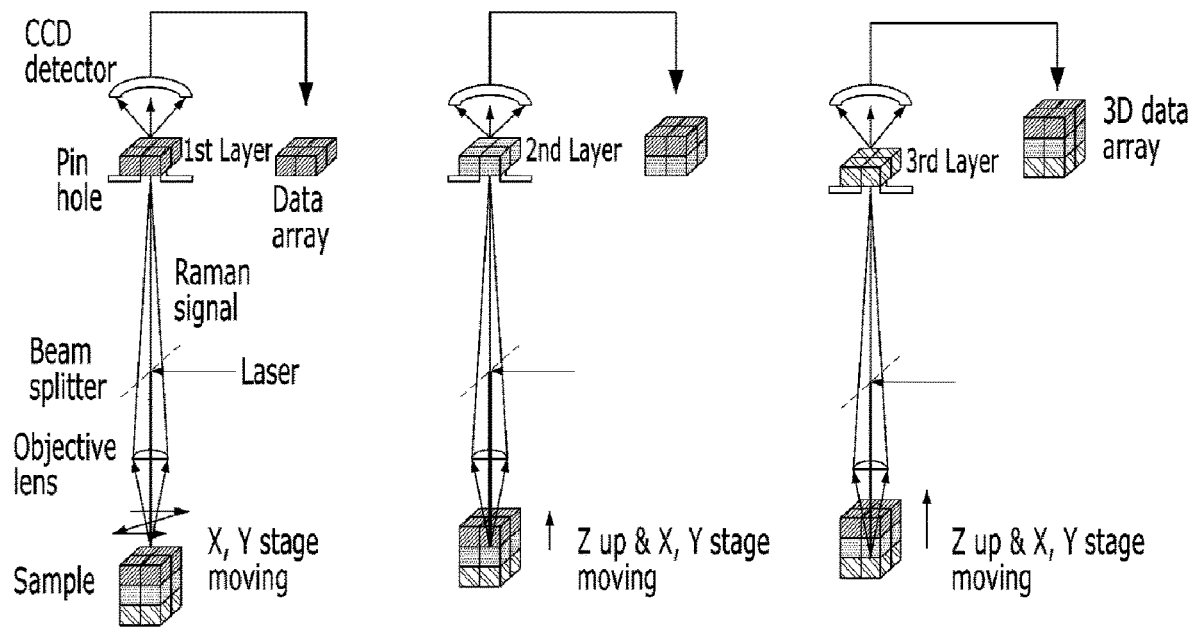
FIG. 7 is a diagram to illustrate the principle of three-dimensional confocal mapping (3D-confocal mapping).
Figure 8:
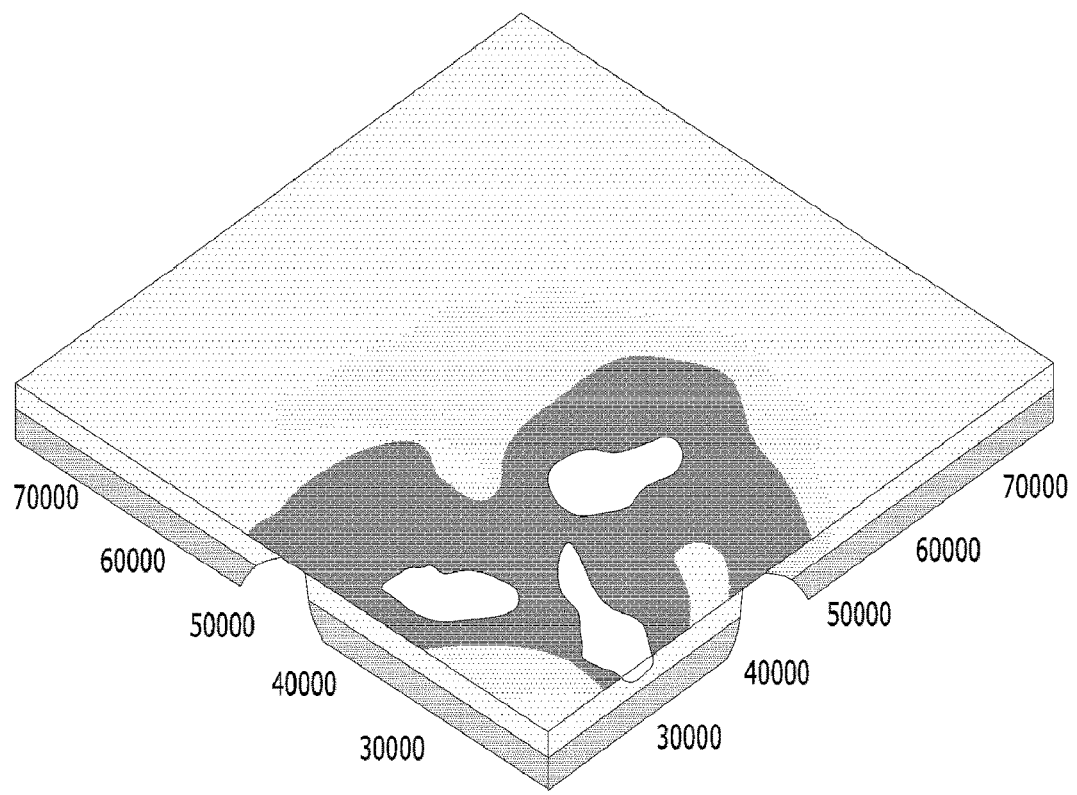
FIG. 8 is a photograph showing a defect image of a film measured by three-dimensional confocal mapping.

FIG. 7 is a diagram to illustrate a principle of three-dimensional confocal mapping, and FIG. 8 is a photograph showing a defect image of a film measured by three-dimensional confocal mapping.

As shown in FIGS. 7 and 8, an advantage obtained when Raman spectroscopy is applied to an optical microscope is that it is confocal measurement in addition to the measurement of micro samples. This is because a signal from a focal point of an objective lens is strongest, so if focus is made on the inside instead of the surface of the sample, it is possible to measure internal components without destroying the sample. Also, if measurement is performed using a series of arrays as shown in FIG. 7, it is possible to non-destructively measure three-dimensional distribution (3D-mapping) of the component.

Figure 9:
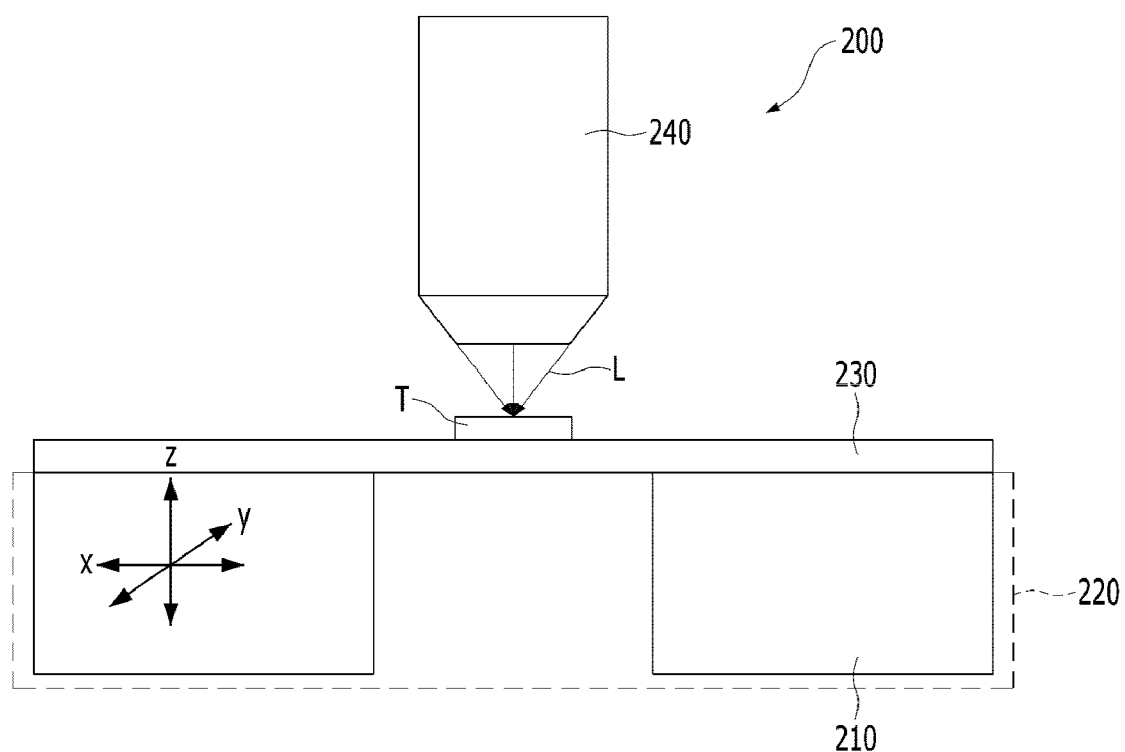
FIG. 9 is a sectional view showing a three-dimensional confocal mapping measuring device for a small hard sample.

FIG. 9 is a sectional view showing a three-dimensional confocal mapping measuring device for a small hard sample.

As shown in FIG. 9, a three-dimensional confocal mapping measuring device (200) for a small rigid sample includes a sample stage (230), at least one piezo element (210) disposed under the sample stage (230), an element holder (220) mounted to a lower portion of the sample stage (230) and equipped with the at least one piezo element (210), and an objective lens (240) for irradiating a laser (L) to the sample (T) fixed to an upper portion of the sample stage (230).

Here, the piezo element (210) whose length varies according to the amount of electrical signal is arranged in x-, y- and z-axis, and the piezo element (210) is mounted inside the element holder (220). The sample stage (230) is fixed to the upper portion of the piezo element (210), so that the sample stage (230) moves together according to the movement of the piezo element (210) in the x-, y- and z-axis according to the electric signal.

Therefore, the sample (T) fixed to the upper portion of the sample stage (230) moves in the same direction and to the same extent. If the three-dimensional confocal mapping measurement is performed in the same manner as in FIG. 7 by using this, a three-dimensional data array can be constructed, thereby enabling three-dimensional image mapping of the sample (T).

Thus, if three-dimensional mapping measurement is performed by combining Raman spectroscopy with an optical microscope and a three-axis piezo stage, it is possible to measure the sample (T) with a small size by fixing the sample (T) on the sample stage (230) not to move. At this moment, scanning is performed in the x- and y-axis, and after moving one step along the z-axis, scanning is repeated in the x- and y-axis. Therefore, if the sample (T) is a small and hard solid, measurement may be performed without any problem since the sample (T) can be stably fixed to the sample stage (230).

However, if the sample (T) has fluidity, it becomes impossible to accurately measure the position of the sample (T) because the sample (T) also is shaken as the sample stage (230) moves. Moreover, there is a problem in that it is impossible to measure a heavy and large sample (T) having fluidity like a living body.

Therefore, the present invention has been designed to solve the problem in three-dimensional mapping measurement for a large living sample with fluidity.

To this end, in the present disclosure, an opening into which the objective lens can be inserted is secured in the center portion of the sample stage, and a transparent window which the light irradiated by the objective lens and the Raman scattered light can go through is installed at the center portion of the sample stage. The transparent window is brought into contact with the flowable sample, and a vertically movable sample holder is installed at a side opposite to the flowable sample so that the degree of contact of the flowable sample to the transparent window may be adjusted.

Now, if the height of the sample holder is adjusted to such an extent that slip does not occur between the transparent window and the flowable sample with the piezo element being electrically driven, the sample stage moves, and accordingly, the transparent window moves so that the flowable sample in contact with the transparent window is also moved.

That is, although the flowable sample is disposed at a position opposite to the three-dimensional confocal mapping measuring device shown in FIG. 9, three-dimensional array data measurement is possible, thereby enabling three-dimensional mapping.

This will be described in more detail with reference to the accompanying drawings below.

Figure 10:
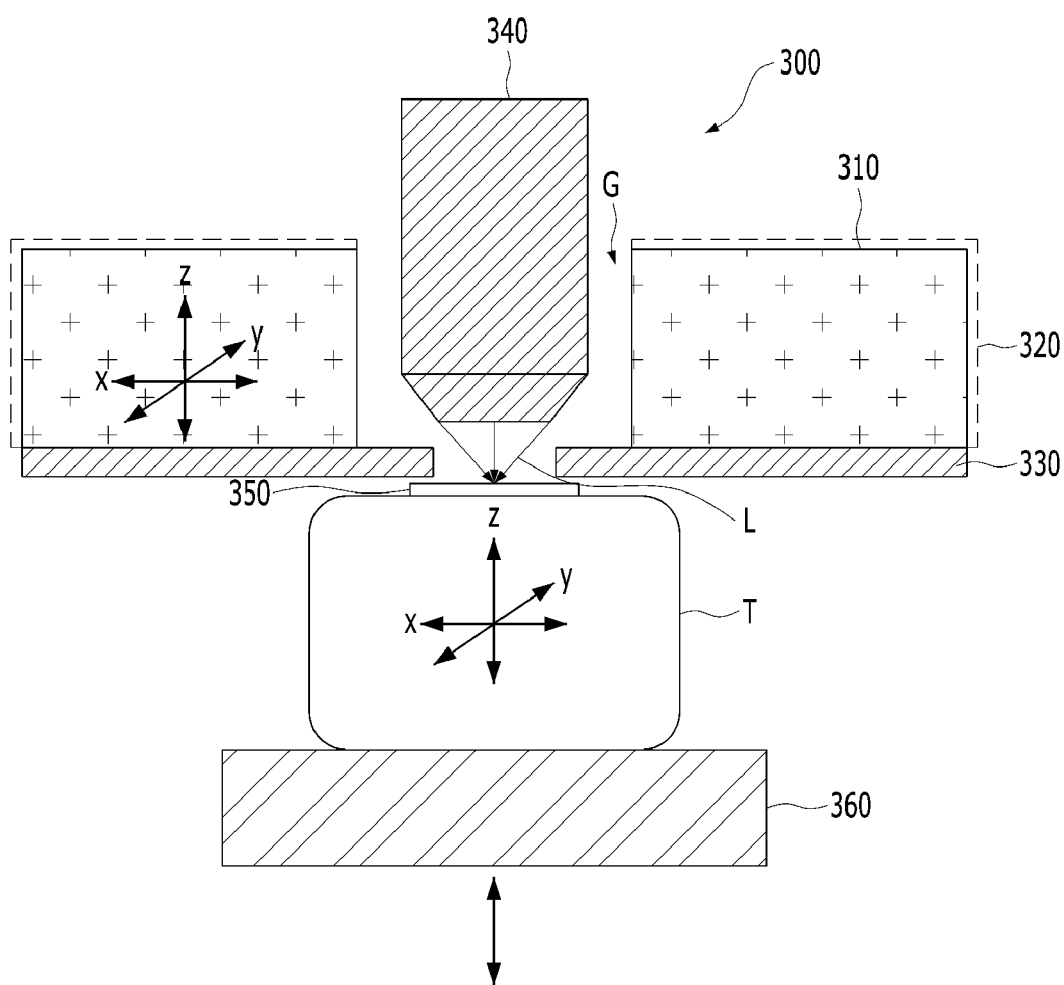
FIG. 10 is a sectional view showing a three-dimensional confocal mapping measuring device for a flowable sample according to the first embodiment of the present disclosure.

FIG. 10 is a sectional view showing a three-dimensional confocal mapping measuring device for a flowable sample according to the first embodiment of the present disclosure.

Referring to FIG. 10, the three-dimensional Raman image mapping measuring device (300) for a flowable sample according to the first embodiment of the present invention includes a piezo element (310), an element holder (320), a sample stage (330), an objective lens (340), a sample holder (360) and a transparent window (350).

At least one piezo element (310) is arranged in a horizontal direction. The element holder (320) is equipped with the at least one piezo element (310) and has an opening (G) that exposes a part of the center portion.

That is, the piezo element (310) whose length varies according to the amount of electrical signal is arranged in the x-, y- and z-axis, and the piezo element (310) is mounted inside the element holder (320).

The sample stage (330) is arranged in a horizontal direction parallel to the piezo element (310) in order to support the element holder (320) equipped with the at least one piezo element (310). Then, according to the movement of the piezo element (310) in the x-, y- and z- axis according to the electric signal, the sample stage (330) moves together.

The objective lens (340) is mounted in the opening (G) of the element holder (320). Here, it is preferable that the opening (G) of the element holder (320) and the objective lens (340) are disposed at the center of the sample stage (330).

The sample holder (360) serves as a controller for vertical movement of the flowable sample (T) disposed under the sample stage (330).

The transparent window (350) is mounted between the sample stage (330) and the sample holder (360). For this, the transparent window (350) may be attached to the lower portion of the sample stage (330). Then, for the transparent window (350), any transparent material may be used without limitation, and it is preferable to use a glass material. The transparent window (350) is in contact with the sample stage (330) and the flowable sample (T) by positional movement of the sample stage (330) or the sample holder (360).

In this case, the transparent window (350) is disposed at a side opposite to the objective lens (340), and while physically pressing and fixing the flowable sample (T) to prevent shaking of the flowable sample (T), the transparent window (350) allows the flowable sample (T) to move in the x-, y- and z- axis according to the movement of the piezo element (310), thereby performing three-dimensional confocal image mapping.

In other words, the three-dimensional Raman image mapping measuring device (300) for a flowable sample according to the first embodiment of the present invention includes the objective lens (340), the x-, y- and z- axis piezo elements (310), the sample stage (330) having a center of the lower portion to which the transparent window (350) is attached, and the sample holder (360) on which the flowable sample (T) is placed.

Therefore, in the three-dimensional Raman image mapping measuring device (300) for a flowable sample according to the first embodiment of the present disclosure, the transparent window (350) attached to the lower portion of the sample stage (330) is located at a side opposite to the objective lens (340) to physically press and fix the flowable sample (T) not to be shaken, and also allows the flowable sample (T) to move in the x-, y- and z- axis according to the movement of the piezo element (310), thereby enabling three-dimensional confocal image mapping.

For the three-dimensional confocal image mapping, the depth of the flowable sample (T) to be measured cannot be deeper than the penetration depth of the Raman laser light used for measurement. In general, a transparent sample may be measured even to a depth in the unit of cm, but in case of biological tissues such as skin, the light may penetrate to the dermal layer of the skin with the penetration depth of several tens of μm when laser (L) with a wavelength of 785 nm is used.

Therefore, the objective lens (340) used for three-dimensional confocal image mapping uses a lens with a magnification of 50-100 times. In this case, the focal length is very short, about 1 mm. Of course, when using a LWD (Long working distance) objective lens (340), the focal length is increased to about 2-3 mm, which is convenient for measurement, but there is a loss of signal sensitivity of several ten % due to the low light collecting power. Therefore, it is appropriate to use a 50×objective lens (340).

Hereinafter, a depth profiling measurement process using the three-dimensional Raman image mapping measuring device for a flowable sample according to the first embodiment of the present invention will be described with reference to the accompanying drawings.

Figure 11:
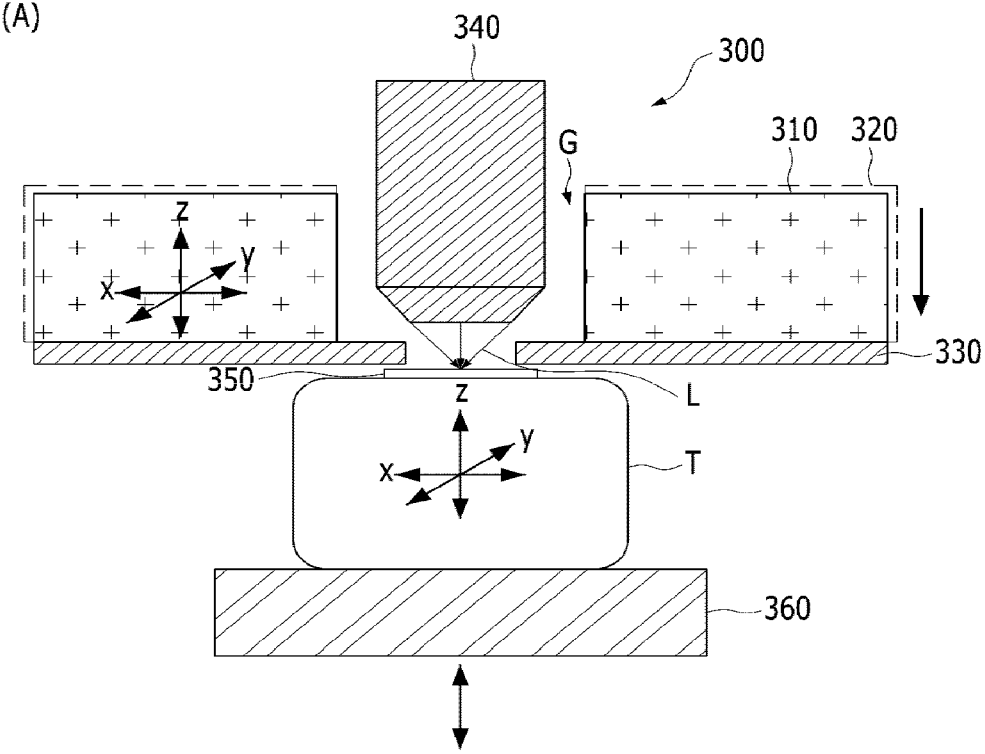
FIG. 11 is a process diagram to illustrate a depth profile by using the three-dimensional Raman image mapping measuring device for a flowable sample according to the first embodiment of the present disclosure.
Figure 11:
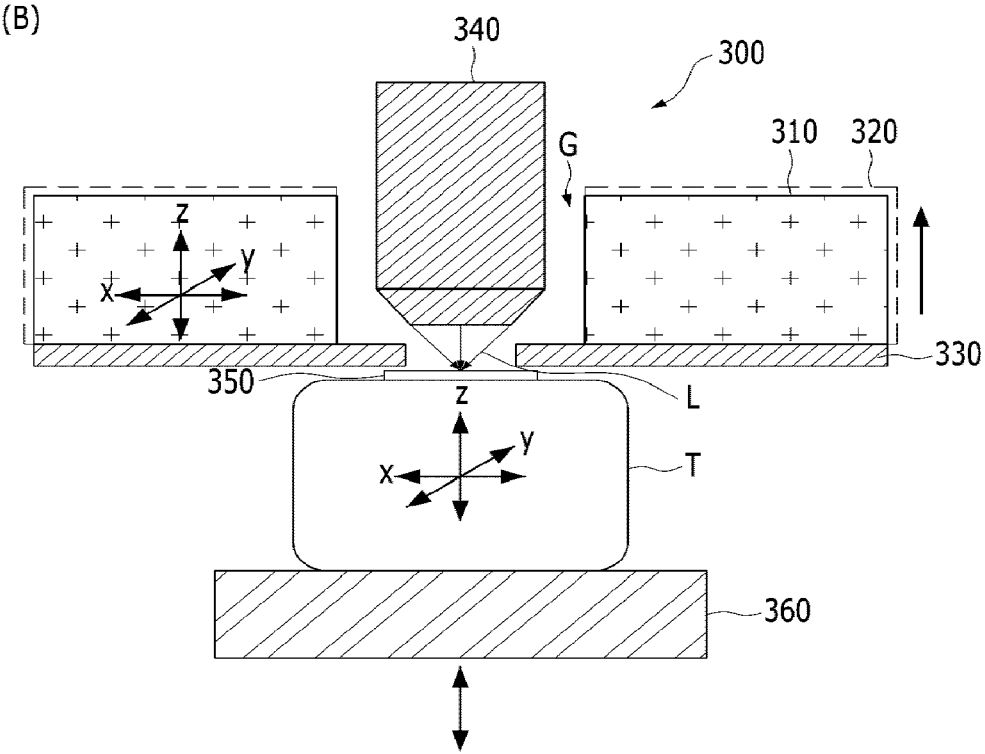

FIG. 11 is a process diagram to illustrate a depth profiling by using the three-dimensional Raman image mapping measuring device for a flowable sample according to the first embodiment of the present disclosure.

First, as shown in (A) of FIG. 11, by moving the sample holder (360) upward, the objective lens (340) is focused on the surface of the flowable sample (T) and then raised further by about 1 mm.

Next, by lowering the sample stage (330) in the z-axis, the flowable sample (T) is pressed by the transparent window (350) so that focus is made on the surface of the flowable sample (T). In this state, the measurement is completely prepared.

Next, as shown in (B) of FIG. 11, if the measurement is completely prepared, the unit movement distance and frequency in the x-, y- and z- axis are determined and measurement is started. Therefore, the focus enters the inside of the flowable sample (T), so that the inside spectrum may be taken. Here, if the measurement process described in FIG. 7 is repeated for each step, three-dimensional confocal mapping array data can be obtained.

Accordingly, in the present disclosure, the three-dimensional confocal image mapping is performed in a way that the distance between the objective lens (340) and the flowable sample (T) is appropriately adjusted using the sample holder (360) and positioning the transparent window 350 by electrically driving the piezo element 310.

In other words, as shown in (A) of FIG. 11, in a state where the flowable sample (T) is slightly pressed to the sample stage (330), if the objective lens (340) is focused on the surface of the flowable sample (T) through the transparent window (350) and scanning is performed in the x- and y- axis, a two-dimensional data array for the surface of the flowable sample (T) is obtained, thereby enabling planar mapping.

After that, as shown in (B) of FIG. 11, if the sample stage (330) is slightly raised upward, the flowable sample (T) slightly expands due to the elasticity of the flowable sample (T), and the objective lens (340) is focused on the inside of the flowable sample (T). In this state, if scanning is performed in the x- and y-axis, planar mapping measurement can be performed for the inside of the flowable sample (T). Accordingly, it is possible to perform three-dimensional image mapping for the inside of the flowable sample (T) by measuring the flowable sample (T) to the penetration depth by the measuring laser.

In the three-dimensional Raman image mapping measuring device for a flowable sample according to the first embodiment of the present invention described above, the transparent window attached to the lower portion of the sample stage is located at a side opposite to the objective lens to physically hold the flowable sample and thus prevent shaking, and at the same time, the flowable sample is moved in the x-, y- and z- axis according to the movement of the piezo element, enabling three-dimensional confocal image mapping.

Figure 12:
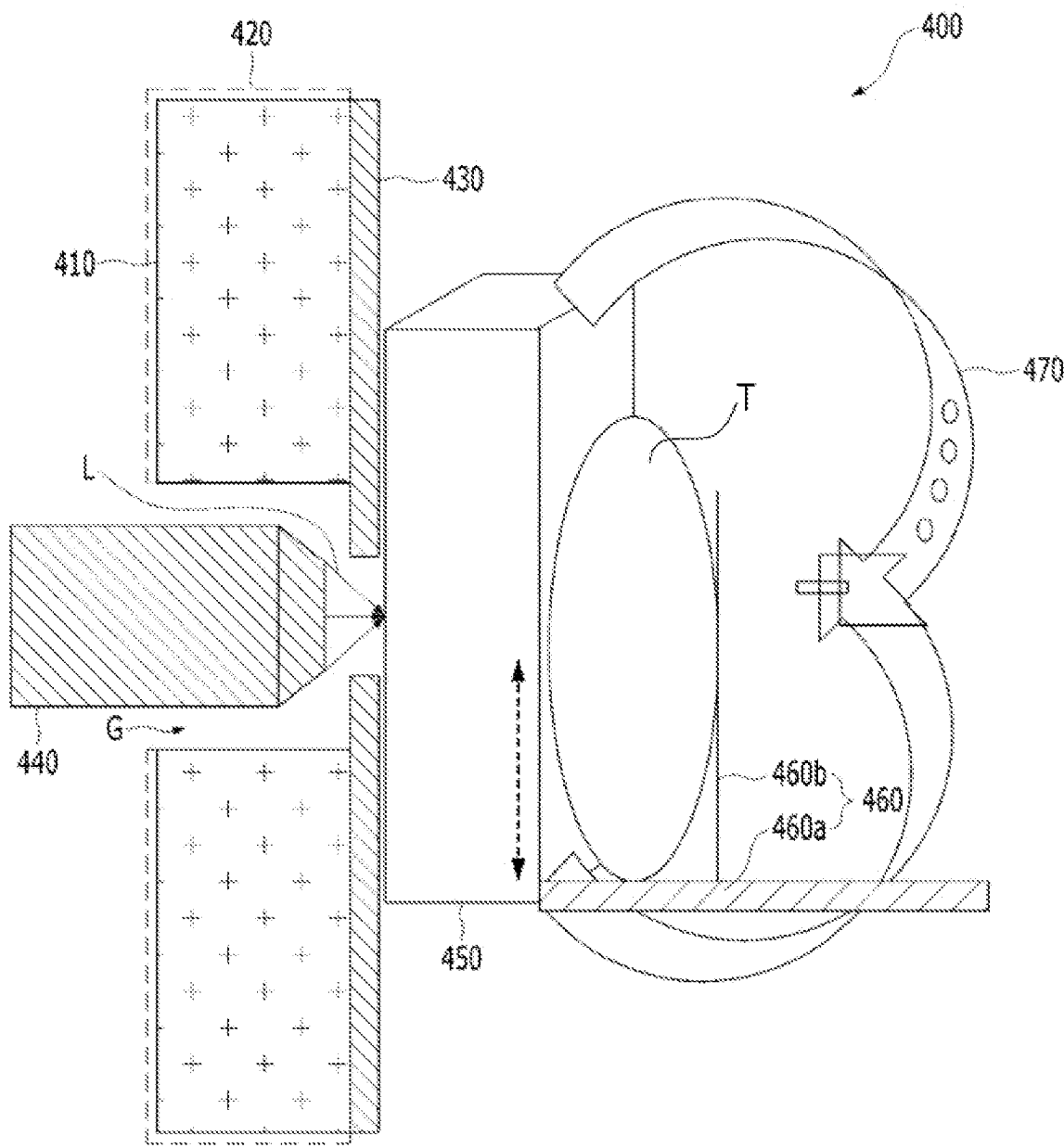
FIG. 12 is a sectional view showing a three-dimensional confocal mapping measuring device for a flowable sample according to the second embodiment of the present disclosure.

Meanwhile, FIG. 12 is a sectional view showing a three-dimensional confocal mapping measuring device for a flowable sample according to the second embodiment of the present disclosure. Here, the three-dimensional Raman image mapping measuring device for a flowable sample according to the second embodiment of the present invention can be used when the size of the flowable sample is very large. In this case, the optical path of the objective lens is rotated at an angle of 90 degrees, and the measuring device is used in a standing state in a vertical direction.

Referring to FIG. 12, the three-dimensional Raman image mapping measuring device (400) for a flowable sample according to the second embodiment of the present invention includes a piezo element (410), an element holder (420), a sample stage (430), an objective lens (440), a transparent window (450), a sample holder (460) and a banding member (470).

At least one piezo element (410) is arranged in a vertical direction. The element holder (420) is equipped with the at least one piezo element (410) and has an opening (G) that exposes a portion of the center.

That is, the piezo element (410) whose length varies according to the amount of electrical signal is arranged in the x-, y- and z- axis, and the piezo element (410) is mounted inside the element holder (420).

The sample stage (430) is arranged parallel to the piezo element (410) in order to support the element holder (420) equipped with the piezo element (410). Then, as the piezo element (410) moves in the x-, y- and z- axis according to the electric signal, the sample stage (430) is moved together.

The objective lens (440) is installed in a vertical direction intersecting the piezo element (410), and is mounted in the opening (G) of the element holder (420). Here, it is preferable that the opening (G) of the element holder (420) and the objective lens (440) are disposed at the center portion of the sample stage (330).

The transparent window (450) is mounted to the lower portion of the sample stage (430). For this, the transparent window (450) may be attached to the lower portion of the sample stage (430). In this case, as the transparent window (450), any transparent material may be used without limitation, and it is preferable to use a glass material. The transparent window (450) is in contact with the sample stage (430) and the flowable sample (T) by positional movement of the sample stage (430) and the sample holder (460).

In this case, the transparent window (450) is disposed at a side opposite to the objective lens (440), and by physically pressing and fixing the flowable sample (T), the transparent window (450) prevents the flowable sample (T) from shaking and allows the flowable sample (T) to move in the x-, y- and z- axis according to the movement of the piezo element (410), thereby performing three-dimensional confocal image mapping.

The sample holder (460) is attached to the transparent window (450) to support the flowable sample (T). The sample holder (460) includes a horizontal support (460a) attached to one surface of the transparent window (450), and a vertical support (460b) extending in a vertical direction from the horizontal support (460a) to support the flowable sample (T) attached to the transparent window (450).

Here, the horizontal support (460a) has a groove along one direction, and the vertical support (460b) may reciprocate horizontally within the groove. On the other hand, the vertical support (460b) may be coupled to the horizontal support (460a) in an integrally fixed form.

The banding member (470) is attached to both side edges of the transparent window (450), and serves to bring the flowable sample (T) into contact with the transparent window (450) by pressing the sample holder (460). The banding member (470) employs any one of a waist belt and a VELCRO type so that a binding position thereof is adjusted.

In the three-dimensional Raman image mapping measuring device for a flowable sample according to the second embodiment of the present invention described above, the transparent window is disposed at a side opposite to the objective lens, and the transparent window physically presses and fixes the flowable sample to prevent shaking of the flowable sample. Moreover, in a state where the banding member fixes the flowable sample in contact with the transparent window by contacting and pressing the sample holder, the flowable sample is moved in the x-, y- and z- axis according to the movement of the piezo element, thereby performing three-dimensional confocal image mapping.

Accordingly, in the three-dimensional Raman image mapping measuring device for a flowable sample according to the second embodiment of the present disclosure, it may become possible to perform measurement for three-dimensional confocal image mapping by means of the banding member whose binding position is adjusted even when the size of the flowable sample is very large.

EXAMPLE

Hereinafter, the configuration and operation of the present invention will be described in more detail through a preferred embodiment of the present disclosure. However, this embodiment is proposed as a preferred example of the present invention and cannot be construed as limiting the present invention in any sense.

Contents not described herein will be omitted because they can be technically inferred sufficiently by those skilled in the art.

Figure 13:
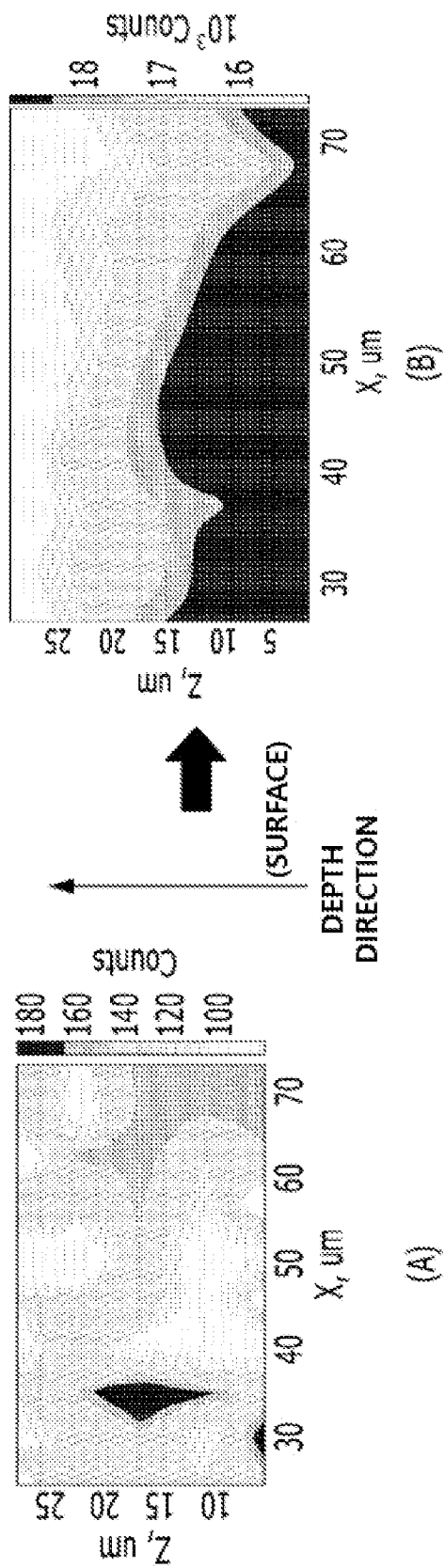
FIG. 13 is a photograph showing an image data measured by mapping a flowable sample in a state before an epoxy compound is applied to a bacon sample and after an epoxy compound is applied in a depth direction to the X-Z axis, by using the three-dimensional Raman image mapping measuring device according to the first embodiment of the present disclosure.

FIG. 13 is a photograph showing image data measured by mapping a flowable sample in a state before an epoxy compound is applied to a bacon sample and after an epoxy compound is applied in a depth direction to the X-Z axis, by using the three-dimensional Raman image mapping measuring device according to the first embodiment of the present disclosure.

As shown in FIG. 13, by using the three-dimensional Raman image mapping measuring device according to the first embodiment of the present disclosure, confocal mapping measurement was performed in the x-z axis in a depth direction without performing any preprocessing on a bacon sample. Therefore, the measurement was performed under conditions that the wavelength of the laser used for Raman measurement was 785 nm, the output on the surface of the flowable sample was 100 mW, the exposure time was 1 second, the number of repetitions was 3, the x-axis measurement length was 70 µm, the z-axis measurement length was 30 µm, the number of x-axis measurement steps was 10, and the number of z-axis measurement steps was 5.

As a result of the measurement, as it may be seen from the mapping image of the data in of (A) of FIG. 13, it can be found that the surface and the inside are in almost similar state.

Meanwhile, by using the three-dimensional Raman image mapping measuring device according to the first embodiment of the present disclosure, confocal mapping measurement was performed in the x-z axis in the depth direction immediately after an epoxy compound was applied to the surface of the bacon sample. Therefore, the measurement was performed under conditions that the wavelength of the laser used for Raman measurement was 785 nm, the output from the bacon sample surface was 100 mW, the exposure time was 1 second, the number of repetitions was 3, the x-axis measurement length was 70 µm, the z-axis measurement length was 30 µm, the number of x-axis measurement steps was 10, and the number of z-axis measurement steps was 5.

As a result of the measurement, as it may be seen in the mapping image of the data of (B) of FIG. 13, the surface shows the darkest shade in the epoxy compound, whereas the inside is almost the same as before, so it can be found that the surface and the inside are in a very different state.

Figure 14:
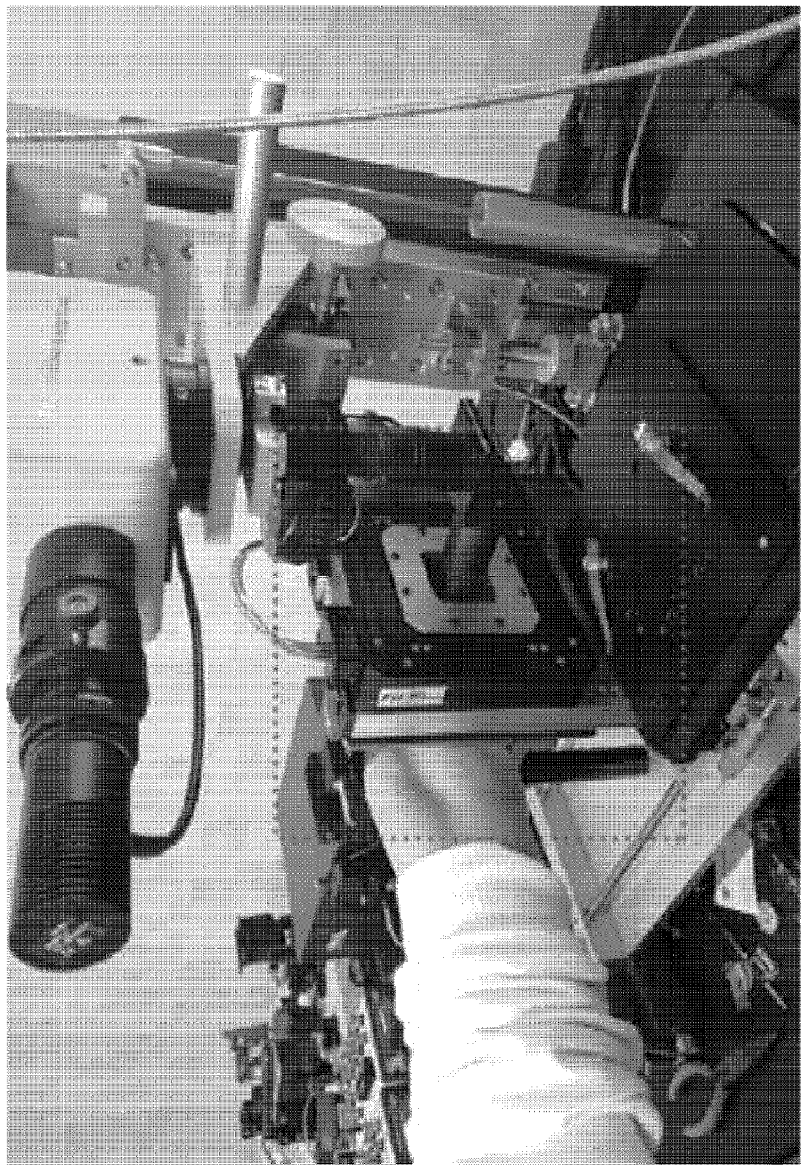
FIG. 14 is a photograph showing the process of measuring the forearm of a human body using the three-dimensional Raman image mapping measuring device for a flowable sample according to the first embodiment of the present disclosure.
Figure 15:
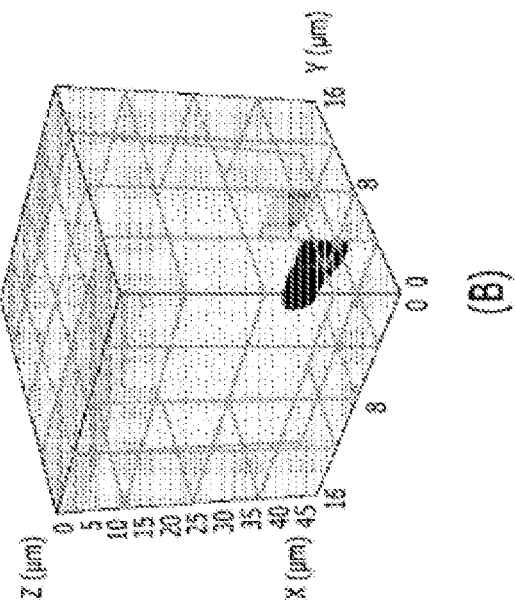
FIG. 15 is a photograph showing skin penetration image data of Cetaphil by using images immediately after Cetaphil is applied to the skin and after 40 minutes since the application.
Figure 15:
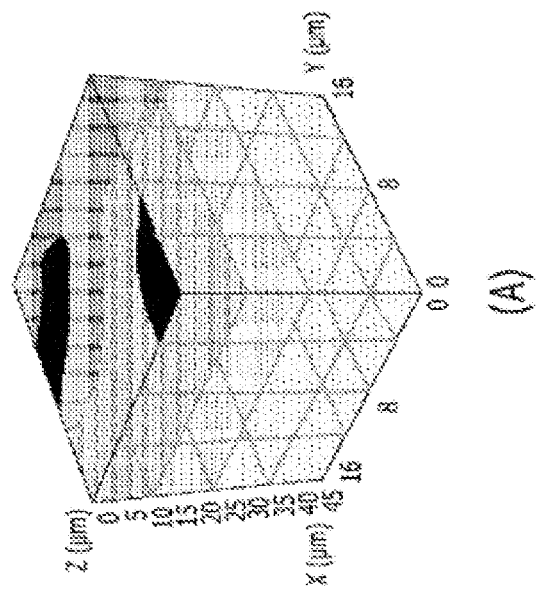

Meanwhile, FIG. 14 is a photograph showing the process of measuring the forearm of a human body using the three-dimensional Raman image mapping measuring device for a flowable sample according to the first embodiment of the present disclosure, and FIG. 15 is a photograph showing skin penetration image data of Cetaphil by using images immediately after Cetaphil is applied to the skin and after 40 minutes since the application.

As shown in FIGS. 14 and 15, by using the three-dimensional Raman image mapping measuring device for a flowable sample according to the first embodiment of the present disclosure, Cetaphil was applied to the surface of the forearm of a human body, and then immediately three-dimensional confocal mapping measurement was performed in the x-y-z axis in the depth direction. Therefore, the measurement was performed under conditions that the wavelength of the laser used for Raman measurement was 785 nm, the output at the surface of the sample was 100 mW, the exposure time was 1 second, the number of repetitions was 3, the x-axis measurement length was 20 μm, the y-axis measurement length was 20 μm, the z-axis measurement length was 20 μm, the number of x-axis measurement steps was 4, the number of y-axis measurement steps was 4, and the number of z-axis measurement steps was 4.

As a result of the measurement, as it may be seen in the mapping image of the data of (A) of FIG. 15, the surface shows a darkest shade in Cetaphil, whereas the inside is almost the same as before, so it can be found that the surface and the inside are in a very different state.

Meanwhile, by using the three-dimensional Raman image mapping measuring device for a flowable sample according to the first embodiment of the present disclosure, three-dimensional confocal mapping measurement was performed in the x-y-z axis in the depth direction when 40 minutes had elapsed after Cetaphil was applied to the surface of the forearm of a human body. In this case, the measurement was performed under conditions that the wavelength of the laser used for Raman measurement was 785 nm, the output at the surface of the sample was 100 mW, the exposure time was 1 second, the number of repetitions was 3, the x-axis measurement length was 20 μm, the y-axis measurement length was 20 μm, the z-axis measurement length was 20 μm, the number of x-axis measurement steps was 4, the number of y-axis measurement steps was 4, and the number z-axis measurement steps was 4.

As a result of the measurement, as it may be seen from the mapping image of the data in (B) of FIG. 15, Cetaphil on the surface was penetrated into the skin to decrease the concentration so that the darkest shade almost disappeared, whereas the concentration of Cetaphil in the inside was partially increased so that there were areas where the dark shade was exhibited. It was found that this was in a state very different from the mapping image of the data in of (A) of FIG. 15.

In the above, the present invention is mainly described based on its embodiment, but various changes or modifications can be made at the level of a person having ordinary skill in the technical field to which the present invention belongs. Such changes and modifications can be regarded as belonging to the present invention as long as they do not depart from the scope of the technical idea provided by the present disclosure. Therefore, the scope of right of the present invention should be judged by the appended claims.

What is claimed is:

1. A three-dimensional Raman image mapping measuring device for a flowable sample, comprising:
at least one piezo element;
an element holder equipped with the piezo element and having an opening;
a sample stage configured to support the element holder equipped with the piezo element and configured to move in the x-, y- and z- axis according to the movement of the piezo element in the x-, y- and z- axis;
a transparent window attached to the sample stage and configured to move in the x-, y- and z- axis according to the movement of the sample stage in the x-, y- and z- axis;
an objective lens mounted in the opening of the element holder;
a sample holder disposed under the sample stage to control vertical movement of a flowable sample; and
a transparent window mounted between the sample stage and the sample holder,
wherein the transparent window contacts the flowable sample in a non-slip manner according to the vertical movement of the sample holder, and configured to move the flowable sample while moving in the x-, y- and z- axis in a state of non-slip contact with the flowable sample.

2. The three-dimensional Raman image mapping measuring device for a flowable sample according to claim 1, wherein the opening of the piezo element holder and the objective lens are disposed at the center portion of the sample stage, respectively.

3. A three-dimensional Raman image mapping measuring device for a flowable sample, comprising:
at least one piezo element arranged in a vertical direction;
an element holder equipped with the piezo element and having an opening;
a sample stage arranged parallel to the piezo element to support the element holder equipped with the piezo element and configured to move in the x-, y- and z- axis according to the movement of the piezo element in the x-, y- and z- axis;
a transparent window attached to the sample stage and configured to move in the x-, y- and z- axis according to the movement of the sample stage in the x-, y- and z- axis;
an objective lens installed in the vertical direction to intersect the piezo element and mounted in the opening of the element holder;
a transparent window mounted to a lower portion of the sample stage;
a sample holder attached to the transparent window to support a flowable sample; and
banding members attached to both side edges of the transparent window to press the sample holder so that the flowable sample comes into contact with the transparent window;
wherein the transparent window contacts the flowable sample in a non-slip manner by the banding members pressing the sample holder, and configured to move the flowable sample while moving in the x-, y- and z- axis in a state of non-slip contact with the flowable sample.

4. The three-dimensional Raman image mapping measuring device for a flowable sample according to claim 3, wherein the sample holder comprises:
a horizontal support attached to one surface of the transparent window; and
a vertical support configured to extend in the vertical direction from the horizontal support and support the flowable sample attached to the transparent window.

5. The three-dimensional Raman image mapping measuring device for a flowable sample according to claim 4, wherein the horizontal support has a groove formed along a direction; and
the vertical support horizontally reciprocates in the groove.

6. The three-dimensional Raman image mapping measuring device for a flowable sample according to claim 3, wherein the banding member employs a waist belt so that a binding position thereof is adjusted.

* * * * *